June 16, 1964
J. J. NASH
3,137,372
FASTENING ELEMENTS
Filed Feb. 23, 1961
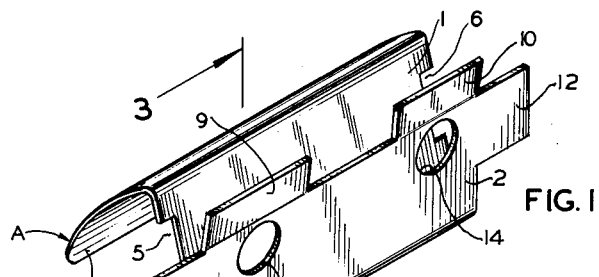
FIG. 1
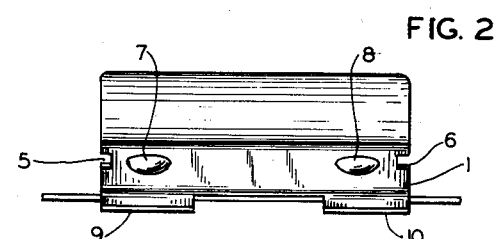
FIG. 2
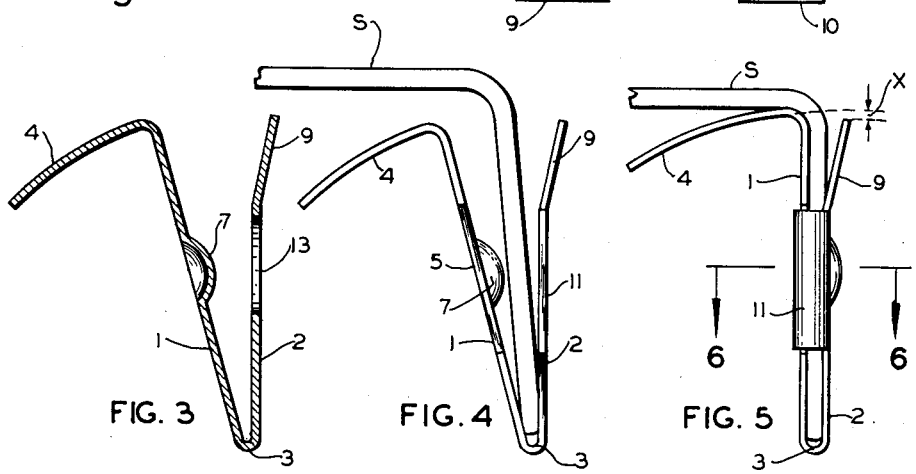
FIG. 3    FIG. 4    FIG. 5
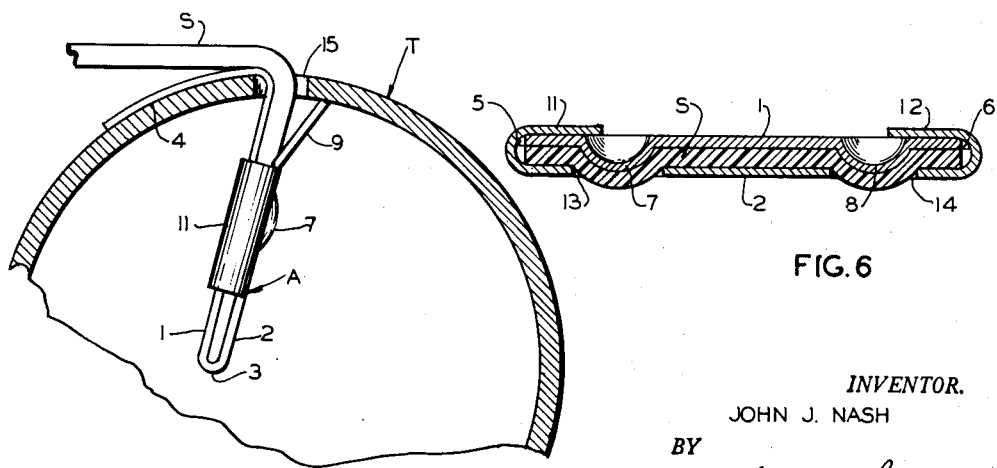
FIG. 6
FIG. 7
INVENTOR.
JOHN J. NASH
BY
*Alfred W. Petchaft*
ATTORNEY

United States Patent Office 3,137,372
Patented June 16, 1964

3,137,372
FASTENING ELEMENTS
John J. Nash, Ferguson, Mo., assignor to Chromcraft Corporation, St. Louis, Mo., a corporation of Missouri
Filed Feb. 23, 1961, Ser. No. 91,065
11 Claims. (Cl. 189—35)

This invention relates in general to certain new and useful improvements in fastening elements and, more particularly, to a clip adapted for attaching the end of a strap or piece of webbing to a piece of tubing or other similar hollow object.

It is the primary object of the present invention to provide a fastening element which can be quickly, permanently and securely attached to the end of a strap, elastic band, or piece of webbing, and then utilized as a means for permanently attaching the latter to a piece of tubing or similar hollow structural member.

It is another object of the present invention to provide an attachment clip of the type stated which can be punched or otherwise formed by rapid, inexpensive, methods and is, therefore, very economical.

It is an additional object of the present invention to provide a fastening element or clip of the type stated which may be used in combination with a piece of tubing or other similar hollow structural element for firmly attaching thereto a strap, resilient band, or piece of webbing.

It is a further object of the present invention to provide a clip of the type stated which may be attached to the end portion of a strap, resilient band, or piece of webbing in a simple and speedy, but, nevertheless, permanent manner.

It is also an object of the present invention to provide an attachment clip of the type stated which can be very quickly and simply inserted within a piece of tubing or similar hollow structural element.

With the above and other objects in view, my invention resides in the novel features of form, construction, arrangement, and combination of parts presently described and pointed out in the claims.

In the accompanying drawing (one sheet):

FIG. 1 is a perspective view of an attachment clip constructed in accordance with and embodying the present invention;

FIG. 2 is a top plan view of the attachment clip;

FIG. 3 is a vertical sectional view taken along line 3—3 of FIG. 1;

FIG. 4 is a side elevational view of the attachment clip in the position in which it is initially disposed around the end of a strap, elastic band, or piece of webbing, just prior to permanent securement thereto;

FIG. 5 is a side elevational view of the attachment clip in the position of permanent securement to the end portion of a strap, elastic band, or piece of webbing;

FIG. 6 is a transverse sectional view taken along line 6—6 of FIG. 5; and

FIG. 7 is a fragmentary sectional view of a piece of tubing with the attachment clip and strap, elastic band, or piece of webbing inserted thereinto in assembled relation.

Broadly speaking, the present invention resides in the provision of a stamped metal clip which may be bent and clamped securely around the end of a relatively broad, flat strap, elastic band, or piece of webbing, and thereby form a metal encased tip which can be quickly and conveniently inserted within an elongated slot formed in a piece of tubing or similar hollow structural element. Moreover, the attachment clip is provided along one longitudinal margin with a relatively broad flange adapted for engagement upon the outer surface of the piece of tubing or hollow structural member along one side of the slot. The attachment clip is also integrally provided along its other longitudinal margin with a plurality of projecting somewhat resilient tongues which can be easily pushed through the slot into the interior of the piece of tubing or hollow structural member, and, after entering into the interior thereof, will spread out and retentively engage the interior surface of the piece of tubing or hollow structural member on the opposite side of the slot with respect to the flange. After the clip has been inserted into the slot, the strap, elastic band, or piece of webbing, is pulled back over the flange so as to extend away from the piece of tubing or hollow structural member in a more or less tangential direction in such a manner that the flange will protect the underside of the strap, elastic band, or piece of webbing, from being cut or abraded by the sharp edges of the slot.

Referring now in more detail and by reference characters to the drawing, which illustrates a preferred embodiment of the present invention, A designates an attachment clip formed preferably from a somewhat resilient, somewhat malleable piece of sheet steel and integrally including two oblong-rectangular plate members 1, 2, integrally connected at their lower margins by a narrow somewhat U-shaped bight 3. Integrally connected along the upper longitudinal margin of the plate member 1, by means of a gentle arcuate bend or so-called radius, is a relatively broad arcuate flange 4. Along its lateral margins, the plate member 1 is provided with oppositely presented rectilinear notches 5, 6, which are of substantially identical shape and are in longitudinal alignment with each other. The plate member 1 is finally provided, approximately midway between its upper and lower margins with two longitudinally spaced somewhat hemispherical protuberances or dimples 7, 8, all as best seen in FIGS. 2 and 3 and for purposes presently more fully appearing.

The plate member 2 is integrally provided along its upper margin with two longitudinally spaced rectilinear prongs 9, 10, which are bent obliquely forwardly, that is to say in the direction toward the right, reference being made to FIG. 3. As will be seen by reference to FIG. 2, the prongs 9, 10, are located generally in upwardly spaced alignment with the dimples 7, 8. Similarly, the plate member 2 is integrally provided along its opposite lateral margins with outwardly projecting rectilinear tabs or ears 11, 12, which are located in registration with, and are somewhat shorter in vertical height than, the notches 5, 6, so that they are adapted to fit within the notches 5, 6. The plate member 2 is also provided, directly beneath the prongs 9, 10, with two circular apertures 13, 14, positioned and sized for overlying embracing relationship with respect to the dimples 7, 8.

S designates the terminal portion of a strap, elastic band, or piece of webbing, which is relatively wide in relation to its thickness. The end portion of the strap S is inserted between the plate members 1, 2, in the manner shown in FIG. 4, and the plate members 1, 2, squeezed tightly together by means of a pair of pliers or other similar tool, until they are substantially in parallel relation. Thereupon, the tabs or ears 11, 12, are bent rearwardly into the notches 5, 6, and around into flatwise abutment against the rearwardly presented face of the plate member 1, substantially as shown in FIGS. 5 and 6. As the attachment clip A is being squeezed into tightly clamped retentive engagement with the end portion of the strap S, the dimples 7, 8, will push portions of the strap S forwardly into and through the apertures 13, 14, substantially as shown in FIG. 6, and thereby greatly increase the retentive engagement between the strap S and the attachment clip A. In fact, it has been found in actual practice that the engagement of the strap S between the dimples 7, 8, and the apertures 13, 14, effectively prevent the strap S from pulling out of engagement with the attachment clip A. In this connection, it should be noted that the transverse width of the attachment clip A is approximately equal to the transverse width of the strap S. Actually, straps, elastic bands, and webbing are conventionally made in a number of standard widths and thicknesses. Thus, it is readily possible to make the attachment clip A in various standard sizes to accommodate the standard sizes in straps, elastic bands, and webbing.

When the attachment clip A is securely fastened to the end of the strap S, such assembly may be manually pushed through an elongated slot 15 formed in and extending axially along a piece of tubing T. During insertion, the prongs 9, 10, will flex slightly rearwardly so as to pass through the slot 15 into the interior of the piece of tubing T and will, thereupon, spread back outwardly to engage retentively against the inner surface of the tubing T along the area thereof which is adjacent to the forward longitudinal margin of the slot 15. Since the upper longitudinal margins of the prongs 9, 10, are directly opposite to the arcuate bend or radius by which the flange 4 is integrally attached to the plate number 1, the engagement of the longitudinal edges of the prongs 9, 10, against the interior surface of the tubing T will draw the flange 4 down into seated engagement against the outer surface of the tubing T along the rear margin of the slot 15 and will, at the same time, cause the attachment clip A to tilt into non-radial position within the tubing T substantially in the manner shown in FIG. 7. In other words, the distance X between the arcuate extension of the undersurface of the flange 4 and the upper longitudinal margins of the prongs 9, 10, as shown in FIG. 5, is substantially smaller than the thickness of the piece of tubing T and bears a dimensional relationship to the thickness of the tubing T such that the attachment clip A will assume the position shown in FIG. 7 when it is inserted through the slot 15 into the tubing T.

It will also be noticed by reference to FIG. 7 that when the strap S is pulled back into operative position and placed under tension, it will extend over the flange 4 and be protected thereby from abrasion or damage which might otherwise result from direct engagement against the longitudinal margin of the slot 15.

It should be understood that changes and modifications in the form, construction, arrangement, and combination of the several parts of the fastening elements may be made and substituted for those herein shown and described without departing from the nature and principle of my invention.

Having thus described my invention, what I claim and desire to secure by Letters Patent is:

1. Means for attaching a strap-like element having a terminal portion to a tubular member having an elongated slot, said means comprising an attachment clip retentively secured upon said terminal portion, said clip and terminal portion in assembled relation being of such transverse cross-sectional size and shape as to fit freely into the slot, said attachment clip being integrally provided on one side with a flange which is seated flatwise upon the external face of the tubular member along one side of the slot, the portion of the strap adjacent to the terminal portion overlying the flange in order that the strap be protected from abrasion at the marginal edge of the slot, said clip further being integrally provided on its opposite side with prong means engaged against the interior surface of the tubular member.

2. Means for attaching a strap-like element having a terminal portion to a tubular member having an elongated slot, said means comprising an attachment clip retentively secured upon said terminal portion, said clip and terminal portion in assembled relation being of such transverse cross-sectional size and shape as to fit freely into the slot, said attachment clip being integrally provided on one side with a flange which is seated flatwise upon the external face of the tubular member along one side of the slot, the portion of the strap adjacent to the terminal portion overlying the flange in order that the strap be protected from abrasion at the marginal edge of the slot, said clip further being integrally provided on its opposite side with a plurality of prongs engaged against the interior surface of the tubular member.

3. Means for attaching a strap-like element having a terminal portion to a tubular member having an elongated slot, said means comprising an attachment clip retentively secured upon said terminal portion, said clip and terminal portion in assembled relation being of such transverse cross-sectional size and shape as to fit freely into the slot, said attachment clip being integrally provided on one side with an arcuate flange which is seated flatwise upon the external face of the tubular member along one side of the slot, the portion of the strap adjacent to the terminal portion overlying the flange in order that the strap be protected from abrasion at the marginal edge of the slot, said clip further being integrally provided on its opposite side with prong means engaged against the interior surface of the tubular member.

4. Means for attaching a strap-like element having a terminal portion to a tubular member having an elongated slot, said means comprising an attachment clip comprising a pair of plates integrally connected at their lower margins by a U-shaped bight and being retentively secured upon said terminal portion, said clip and terminal portion in assembled relation being of such transverse cross-sectional size and shape as to fit freely into the slot, said attachment clip being integrally provided on one side with a flange which is seated flatwise upon the external face of the tubular member along one side of the slot, the portion of the strap adjacent to the terminal portion overlying the flange in order that the strap be protected from abrasion at the marginal edge of the slot, said clip further being integrally provided on its opposite side with prong means engaged against the interior surface of the tubular member.

5. Means for attaching a strap-like element having a terminal portion to a tubular member having an elongated slot, said means comprising an attachment clip comprising a pair of plates integrally connected at their lower margins by a U-shaped malleable bight and being retentively secured upon said terminal portion, said clip and terminal portion in assembled relation being of such transverse cross-sectional size and shape as to fit freely into the slot, said attachment clip being integrally provided on one side with a flange which is seated flatwise upon the external face of the tubular member along one side of the slot, the portion of the strap adjacent to the terminal portion overlying the flange in order that the strap be protected from abrasion at the marginal edge of the slot, said clip further being integrally provided on its opposite side with prong means engaged against the interior surface of the tubular member.

6. Means for attaching a strap-like element having a terminal portion to a tubular member having an elongated slot, said means comprising an attachment clip comprising a pair of plates integrally connected at their lower margins by a U-shaped malleable bight and being retentively secured upon said terminal portion, said clip and terminal portion in assembled relation being of such transverse cross-sectional size and shape as to fit freely into the slot, said attachment clip being integrally provided on one side with a flange which is seated flatwise upon the external face of the tubular member along one side of the slot, the portion of the strap adjacent to the terminal portion overlying the flange in order that the strap be protected from abrasion at the marginal edge of the slot, said clip further being integrally provided on its opposite side with a plurality of resilient prongs engaged against the interior surface of the tubular member.

7. Means for attaching a strap-like element having a terminal portion to a tubular member having an elongated slot, said means comprising an attachment clip retentively secured upon said terminal portion by means of bent ears, said clip and terminal portion in assembled relation being of such transverse cross-sectional size and shape as to fit freely into the slot, said attachment clip being integrally provided on one side with a flange which is seated flatwise upon the external face of the tubular member along one side of the slot, the portion of the strap adjacent to the terminal portion overlying the flange in order that the strap be protected from abrasion at the marginal edge of the slot, said clip further being integrally provided on its opposite side with prong means engaged against the interior surface of the tubular member.

8. Means for attaching a strap-like element having a terminal portion to a tubular member having an elongated slot, said means comprising an attachment clip comprising a pair of plates integrally connected at their lower margins by a U-shaped bight and being retentively secured upon said terminal portion, said plates having complementarily-shaped elements for deforming and locking into said terminal portion, said clip and terminal portion in assembled relation being of such transverse cross-sectional size and shape as to fit freely into the slot, said attachment clip being integrally provided on one side with a flange which is seated flatwise upon the external face of the tubular member along one side of the slot, the portion of the strap adjacent to the terminal portion overlying the flange in order that the strap be protected from abrasion at the marginal edge of the slot, said clip further being integrally provided on its opposite side with prong means engaged against the interior surface of the tubular member.

9. Means for attaching a strap-like element having a terminal portion to a tubular member having an elongated slot, said means comprising an attachment clip comprising a pair of plates integrally connected at their lower margins by a U-shaped bight and being retentively secured upon said terminal portion, one of said plates having projecting dimples and the other of said plates having matching aperture for retentive engagement with said terminal portion, said clip and terminal portion in assembled relation being of such transverse cross-sectional size and shape as to fit freely into the slot, said attachment clip being integrally provided on one side with a flange which is seated flatwise upon the external face of the tubular member along one side of the slot, the portion of the strap adjacent to the terminal portion overlying the flange in order that the strap be protected from abrasion at the marginal edge of the slot, said clip further being integrally provided on its opposite side with prong means engaged against the interior surface of the tubular member.

10. An attachment clip comprising two flat plate-like members integrally connected along one longitudinal margin by a U-shaped bight, one of said plate members being provided along its other margin with a laterally projecting arcuate flange, the other of said plate members being provided along its other margin with prong-forming means extending outwardly at an oblique angle thereto, the plate with the arcuate flange being provided with elongated rectangular notches on its lateral margins, and the plate having the prong-forming means being provided along its lateral margins with integrally formed ears for fitting into said notches, said notches being larger than the ears, said ears being bent around the other plate to hold the plates in clamped position.

11. An attachment clip comprising two flat plate-like members integrally connected along one longitudinal margin by a U-shaped bight, one of said plate members being provided along its other margin with a laterally projecting flange, the other of said plate members being provided along its other margin with prong-forming means extending outwardly at an oblique angle thereto, one of said plates being provided along its lateral edges with elongated rectangular notches, the other of said plates being provided along its lateral margins with integrally formed ears for fitting into said notches, both being bent around the other plate so as to hold said plates in clamped position.

References Cited in the file of this patent

UNITED STATES PATENTS

| | | |
|---|---|---|
| 1,987,035 | Tideman | Jan. 8, 1935 |
| 2,546,050 | Weaver | Mar. 20, 1951 |
| 2,622,663 | Burd | Dec. 23, 1952 |
| 2,809,142 | Beeber | Oct. 8, 1957 |
| 2,832,399 | Varkala | Apr. 29, 1958 |
| 2,845,671 | Fisher | Aug. 5, 1958 |
| 2,957,219 | Van Buren | Oct. 25, 1960 |
| 2,968,854 | Panicci | Jan. 24, 1961 |